US010378245B2

(12) United States Patent
Jordan et al.

(10) Patent No.: US 10,378,245 B2
(45) Date of Patent: Aug. 13, 2019

(54) ELECTRO-MECHANICAL LATCHING/LOCKING WITH INTEGRATED TOUCH/PUSH ACTIVATION

(71) Applicant: Accuride International Inc., Santa Fe Springs, CA (US)

(72) Inventors: Scott Jordan, Santa Fe Springs, CA (US); Bruk Sahilu, Santa Fe Springs, CA (US); Charles Milligan, Santa Fe Springs, CA (US)

(73) Assignee: Accuride International Inc., Santa Fe Springs, CA (US)

( * ) Notice: Subject to any disclaimer, the term of this patent is extended or adjusted under 35 U.S.C. 154(b) by 447 days.

(21) Appl. No.: 15/001,136

(22) Filed: Jan. 19, 2016

(65) Prior Publication Data

US 2016/0208520 A1 Jul. 21, 2016

Related U.S. Application Data

(60) Provisional application No. 62/104,665, filed on Jan. 16, 2015.

(51) Int. Cl.

| | |
|---|---|
| ***G01M 1/38*** | (2006.01) |
| ***E05B 65/46*** | (2017.01) |
| ***E05B 47/06*** | (2006.01) |
| *E05B 47/00* | (2006.01) |
| *E05C 19/02* | (2006.01) |

(52) U.S. Cl.

CPC .......... *E05B 65/46* (2013.01); *E05B 47/0607* (2013.01); *E05B 47/0012* (2013.01); *E05B 2047/0069* (2013.01); *E05C 19/022* (2013.01); *E05C 19/024* (2013.01)

(58) Field of Classification Search

CPC ... E05B 65/46; E05B 47/0607; E05B 47/0012
USPC .................................. 700/275; 292/201, 216
See application file for complete search history.

(56) References Cited

U.S. PATENT DOCUMENTS

| | | | |
|---|---|---|---|
| 7,878,560 B1 | 2/2011 | Scheffler et al. | |
| 2003/0127866 A1 | 7/2003 | Martinez et al. | |
| 2005/0179349 A1 | 8/2005 | Booth et al. | |
| 2009/0284025 A1* | 11/2009 | Salcombe | B64C 25/26 292/201 |
| 2011/0056253 A1* | 3/2011 | Greiner | B62B 3/1404 70/85 |
| 2011/0101839 A1* | 5/2011 | Boks | A47B 88/467 312/333 |

(Continued)

FOREIGN PATENT DOCUMENTS

| | | |
|---|---|---|
| CN | 2830593 Y | 10/2006 |
| CN | 103827422 A | 5/2014 |

(Continued)

OTHER PUBLICATIONS

Extended European Search Report on related European Application No. 16743862.1 from the European Patent Office (EPO) dated Dec. 14, 2017.

(Continued)

*Primary Examiner* — Connie C Yoha
(74) *Attorney, Agent, or Firm* — Klein, O'Neill & Singh, LLP

(57) ABSTRACT

An electro-mechanical locking device, particularly for cabinetry, with some embodiments used in connection with a drawer slide.

31 Claims, 19 Drawing Sheets

(56) References Cited

U.S. PATENT DOCUMENTS

| | | | |
|---|---|---|---|
| 2013/0069514 | A1 | 3/2013 | Hashemi et al. |
| 2014/0021843 | A1 | 1/2014 | Hashemi et al. |

FOREIGN PATENT DOCUMENTS

| | | | |
|---|---|---|---|
| CN | 203729162 | U | 7/2014 |
| DE | 20210528 | U1 | 10/2002 |
| DE | 102007033451 | A1 | 1/2009 |
| DE | 202011105059 | U1 | 12/2012 |
| KR | 20-0440074 | Y1 | 5/2008 |
| WO | WO 2014/015182 | A1 | 1/2014 |

OTHER PUBLICATIONS

International Search Report on related PCT Application No. PCT/US2016/013961 from International Searching Authority (KIPO) dated Apr. 28, 2016.

Written Opinion on related PCT Application No. PCT/US2016/013961 from International Searching Authority (KIPO) dated Apr. 28, 2016.

Office action on related Canadian Patent Application No. 2974118 from the Canadian Intellectual Property Office (CIPO) dated Jun. 7, 2018.

Office action on related Chinese Application No. 201680013065.7 from the China National Intellectual Property Administration (CNIPA) dated Sep. 29, 2018.

* cited by examiner

ELECTRO-MECHANICAL LATCHING/LOCKING WITH INTEGRATED TOUCH/PUSH ACTIVATION

CROSS REFERENCE TO RELATED APPLICATION

This application claims the benefit of the filing date of U.S. Provisional Patent Application No. 62/104,665, filed on Jan. 16, 2015, the disclosure of which is incorporated by reference herein.

BACKGROUND OF THE INVENTION

This invention relates generally to drawer slides and cabinetry, and more particularly, to access of cabinetry using an electronically actuated latching and locking system, which may have a touch or push activation feature.

Cabinets often include doors or drawers for enclosed storage space for various items. At times control of access to the enclosed storage space may be desired, for example in retail or other environments. The control of access may be desired to limit access to appropriate persons or to determine time when access was made, or both.

Unfortunately, devices providing control of access to the enclosed storage space may present difficulties. The devices may be burdensome to use, may require exceedingly fine exact machining, or may insufficiently control access to the enclosed storage space.

BRIEF SUMMARY OF THE INVENTION

Aspects of the invention is in the technical field of cabinetry. More particularly, aspects of the invention relate to the technical field of electronic security and access to cabinetry, which in some embodiments is stationary and/or portable cabinetry.

In one embodiment, aspects of the invention provide an electro-mechanical device for locking and/or latching and unlocking and/or unlatching a cabinet door with a touch or push activation.

In another embodiment, aspects of the invention provide an electro-mechanical device for locking and/or latching and unlocking and/or unlatching a drawer with a touch or push activation.

Some aspects of the invention provide an electro-mechanical locking device for cabinetry, comprising a rotatable latch receiver for receiving a latch striker, a lever arm for maintaining the latch receiver in a locking position, an actuator for driving the lever arm to an unlocking position, a first sensor for detecting an indication of inward movement, relative to the cabinetry, of the latch striker, and a controller configured to command the actuator to drive the lever arm to the unlocking position based on detection by the first sensor of the indication of inward movement of the latch striker. In some such aspects, the controller is configured to command the actuator to drive the lever arm to the unlocking position only upon every other occurrence of the first sensor detecting the indication of inward movement of the latch striker. In some such aspects, the controller is configured to command the actuator to drive the lever arm to the unlocking position only if a command has also been received from an external access control device. In some such aspects the external access control device is a radio frequency identification (RFID) device. In some such aspects the controller is additionally configured to command the actuator to drive the lever arm to the unlocking position based on a signal indicative of inward movement, relative to the cabinetry, of a second latch striker, the second latch striker being of a second electro-mechanical locking device for cabinetry.

Another aspect of the invention provides a method of operating a lock for a cabinet, the lock including a latch receiver for receiving a latch striker and an actuator for unlocking the latch receiver, and a controller for commanding operation of the actuator, the method comprising: receiving a first indication that the latch striker has moved to a position inward in the cabinet; commanding, by the controller, the actuator to provide for unlocking of the latch receiver.

Another aspect of the invention provides a first controller for controlling a locking mechanism for a drawer coupled to cabinetry by at least two drawer slides, the first controller maintaining an indication of status of the drawer, the first controller configured to: receive a first indication from a first sensor that the drawer is pressed inward into the cabinetry; receive a second indication from a second sensor that the drawer is pressed inward into the cabinetry; and upon receipt of either the first indication or the second indication, if the indication of status of the drawer is closed, command a locking mechanism associated with the first drawer slide to move to an unlocking position.

Another aspect of the invention provides for a locking system for cabinetry, comprising: at least one locking device, each including a receiver for receiving a striker and means for maintaining the receiver in a locked position; and a controller configured to command unlocking of the receiver by the means for maintaining the receiver in the locked position based on an indication that a striker associated with at least one of the at least one of the locking devices has been moved inward into the cabinetry.

Another aspect of the invention provides a locking system for cabinetry, comprising: a locking device including a receiver for receiving a striker, means for maintaining the receiver in a locked position, and an actuator for actuating the means for maintaining the receiver in the locked position; a first sensor for determining whether the receiver is in a locked position; a second sensor for determining if the means for maintaining the receiver in the locked position is in a locking position; a third sensor for determining an indication of whether the actuator is in a state to allow the means for maintaining the receiver in the locked position to be in a locking position; and a controller configured to command the actuator to allow the means for maintaining the receiver in the locked position to be in an unlocking position and to determine an indication of whether the receiver is securely maintained in the locked position.

These and other aspects of the invention are more fully comprehended upon review of this disclosure.

DETAILED DESCRIPTION

Figure 1:
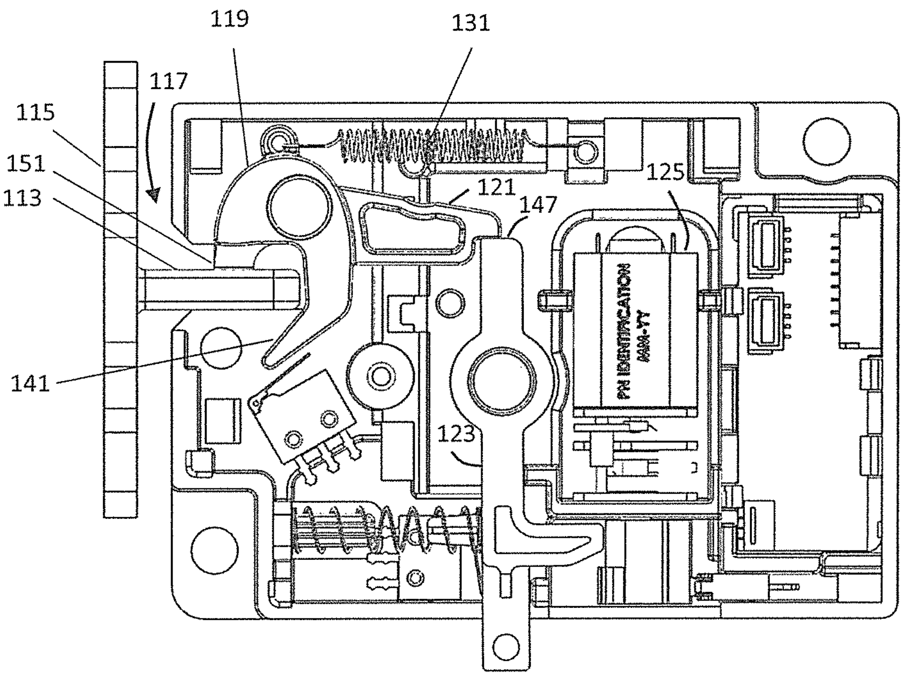
FIG. 1 is a view of a stand-alone electro-mechanical latch/locking device with a cover removed for clarity of the components within the device.

In aspects of the invention an electro-mechanical device allow for controlled access to latched or locked cabinetry, with some embodiments including use of an external access control device, examples of which include a keypad, RFID reader, biometric, NFC or any other device used to authenticate a user. In FIGS. 1 through 6 the electro-mechanical device is shown as a stand alone device. The device includes a latch receiver for receiving and locking in position a striker or catch, for example mounted to a drawer, door, or drawer slide coupled to a drawer. A lever arm may be used to maintain the latch receiver in a locking position, with the lever arm moved to an unlocking position by an actuator, as commanded by control circuitry. In some embodiments the actuator is a motor. In some embodiments the actuator is a solenoid driven device, and in some embodiments the actuator is another electrically (or hydraulically) driven device. For convenience, the actuator will generally be referred to as a motor herein. In various embodiments the control circuitry maintains the lever arm in the locking position until a sensor indicates the drawer, for example, has been pressed inward into the cabinet, when the drawer was already in closed and locked position. In various embodiments, the control circuitry may be housed in a housing with a locking mechanism. In some embodiments the housing may be attached or integrated with a drawer slide. The sensor may be a switch, for example, and the switch may detect when the latch receiver has been moved, or rotated, in a direction indicating that the drawer has been displaced inward into a cabinet holding the drawer. In some embodiments the control circuitry is configured, for example by program instructions, to determine whether to command the motor to move the lever arm to a locking position or an unlocking position based on signals from the sensor.

In some embodiments the electro-mechanical device of FIGS. 1-6, which may also be considered an electro-mechanical latching and locking device, is used in conjunction with an external access control device. The external access control device may be used to permit, but not command, unlocking by the electro-mechanical latching and locking device. For example, the electro-mechanical latching and locking device does not release the mechanical device once a command is received from an external access control device, for example an RFID router. Instead, the control circuitry, which may be considered an onboard or in cabinet control circuit in various embodiments, receives this signal and then awaits an input from the electro-mechanical device. This input may be in the form of an input from a sensor indicating inward displacement, relative to a cabinet, of the catch or striker in a direction as to move or bias the latch receiver. In such embodiments the sensor monitors the position of the latch receiver. In some embodiments the sensor monitors position of a door or drawer of a cabinet, for example a door or drawer to which the catch or striker is attached. In some embodiments the sensor is a switch. Once this sensor is activated the onboard control circuit registers this signal and commands the motor to rotate in a direction to cause a motor cam to displace the lever arm that maintains the latch receiver in a locked position. Once the motor cam has displaced the lever arm the latch receiver is free to move and release the catch or striker allowing the cabinet to open. The onboard control circuit can be programmed to control the amount of time required to confirm an activation command by the sensor and the amount of time the motor is commanded to rotate.

Once the sensor has provided an activation signal, through monitoring position of the latch receiver for example, and the latch receiver is displaced once again with outward movement of the catch, providing a change in state to the sensor, the control circuit can be programmed to once again activate the motor and return the lever arm to its original position. The latch receiver is then biased by inward movement of the catch or striker to move the latch receiver back to the latched and locked position.

A feature of the circuit and the design, in some embodiments, allows for the electro-mechanical device to latch and release with every second sensor activation. In such circumstances if the access control device is programmed to apply the external signal for an extended period of time, a user can repeatedly latch and unlatch the electro-mechanical device until such time that the external signal is removed. As such this action compares to a mechanical touch release mechanism that releases and secures with every other compression cycle.

In some embodiments control circuits of lock mechanisms for multiple drawers are in communication. In some embodiments each control circuit is also configured to only allow unlocking of a single drawer of a cabinet with multiple drawers. For example, if one control circuit indicates its drawer is unlocked, the other control circuits will not allow unlocking of their drawers. Such a configuration provides an electronic interlock or anti-tip feature, which may be useful for tall cabinetry stacked drawers for which opening of multiple drawers may create a tipping hazard. In addition, in some embodiments communication of information between control circuits of multiple drawers is used to avoid undesired unlocking or locking of one drawer due to vibrations resulting from opening or closing another drawer. In such embodiments the control circuits may be configured such that a change in sensor status for a particular drawer is ignored if sensor status for another drawer, for example indicating opening or closing of the other drawer, has occurred within a predefined period of time, for example 0.5 seconds, immediately prior to the change in sensor status for the particular drawer.

Turning now to FIG. 1, FIG. 1 illustrates a view of a stand-alone electro-mechanical latch/locking device (sometimes referred to herein as a lock mechanism) in accordance with an embodiment of the present invention. The device is shown in the lock/latched position with the catch or striker engaged with the electro-mechanical latch/locking device. The device contains at least one positional sensor, with a plurality of sensors shown, that are used to identify the position of the lever arm and the cam of the gear motor. In FIG. 1 the wires that lead from the sensors and motor to the control circuit are not shown. Generally, in the embodiment of FIG. 1, a catch or a striker 113 extends from a face plate 115 mounted to a rear of a drawer (not shown), or a portion of a drawer slide member that is intended to be mounted to and move with a drawer. The electro-mechanical latch/locking device is coupled to a cabinet, or a drawer slide member that is intended to be mounted to and maintained in position with respect to a cabinet. In some embodiments however, the device may be mounted to a cabinet, positioned to receive a striker on a door, and may be used to lock and/or latch the door. As illustrated, the electro-mechanical latch/locking device is coupled to a portion of a drawer slide member intended to be mounted to a cabinet, although in some embodiments the electro-mechanical latch/locking device may be mounted to the cabinet. In most embodiments, the electro-mechanical latch/locking device is dimensioned so as to fit within an operating envelope of the drawer slide, and in some embodiments the electro-mechanical latch/locking device is mounted within the operating envelope of the drawer slide. The operating envelope of the drawer slide is generally a space having a width less than or equal to spacing between a cabinet wall and a drawer and having a height of approximate or less than a height of a drawer. In some embodiments the electro-mechanical latch/locking device is dimensioned to fit within a profile of the drawer slide. In some embodiments, the thickness of the lock mechanism, and/or the components comprising components of the lock mechanism, is approximately ½ inch, although in some embodiments the thickness is ⅜ inch, and in some embodiments the thickness is ¾ inch.

The electro-mechanical latch/locking device includes a latch receiver 119. The latch receiver 119 receives the striker 113 when the drawer slide is in or approximate a closed position. The latch receiver 119 is maintained in a locked position by a lever arm 123, which is moveable between a locking position and an unlocking position by activation of a motor 125. In some embodiments the latch receiver 119 is maintained in the locked position by engagement with a first end 147 of the lever arm 123. In some embodiments, for example as illustrated in FIG. 1, the latch receiver 119 is biased towards an open or unlocked position by a latch spring 131. Movement of the lever arm 123 to the unlocking position, for example using a motor 125 and associated driving mechanism, releases the latch receiver 119 to the unlocked position.

In the embodiment illustrated in FIG. 1, the striker face plate 115, and/or striker 113, can be carried by the drawer or drawer slide member, with the striker 113 extending from the drawer or drawer slide member towards the electro-mechanical latch/locking device. Preferably the striker 113 extends towards the electro-mechanical latch/locking device a distance calculated to allow the striker 113 to move in an unobstructed fashion to engage the latch receiver 119. The striker 113 should also be able to bias against the latch receiver 119 and rotate the latch receiver 119.

The striker 113 may be welded or otherwise attached to the extension of the inner slide member or mounted to the drawer, for example by way of the striker face plate if present. In other embodiments, the striker 113 may be formed of the material of the inner slide member, and may, for example, be in the form of a hook or a ring, or other form punched or pressed from the material of the inner slide member.

The electro-mechanical latch/locking device includes components configured to work in combination to capture the striker 113 within the latch receiver 119 and secure the inner slide member or drawer in the closed or locked position. Conversely, the components of the electro-mechanical latch/locking device may also be activated to release the striker 113 from the latch receiver 119 and thus, release the inner slide member or drawer to allow it to return to the open position. The latch receiver 119 captures the striker 113, such that the striker 113, and therefore the inner slide member or the drawer, is prevented from moving to an open position. Thus, the striker 113 and the latch receiver 119 may together be considered a latch.

The latch receiver 119 is rotatably mounted using a screw or rivet to a housing base 111. Alternately, in some embodiments the electro-mechanical latch/locking device, or in some embodiments the latch receiver 119, may be mounted to an outer slide member or a cabinet frame. The latch receiver 119 is generally U-shaped, defined by two legs that extend from the latch receiver, a first leg 151 and a second leg 141, with the first leg 151 and the second leg 141 defining a basin there between for receiving the striker 113. The first leg 151 is configured to slip into engage with the striker 113 forming a latch. In one embodiment, the striker 113 is shaped as a hook or a ring to receive the first leg 151 which is shaped as a cylinder. The shape and structure of the striker 113 and the first leg 151 is not limited, as long as the first leg 151 can be rotated and engage with the striker 113 in the closed position, which prevents the drawer from opening. A third leg 121 extends from one side of the of the generally U-shaped latch receiver 119 approximately perpendicular to the basin. In one embodiment, the third leg 121 extends straight from the latch receiver 119, and in some embodiments, such as shown in FIG. 1, has a notch to receive the first end 147 of the lever arm 123.

Figure 2:
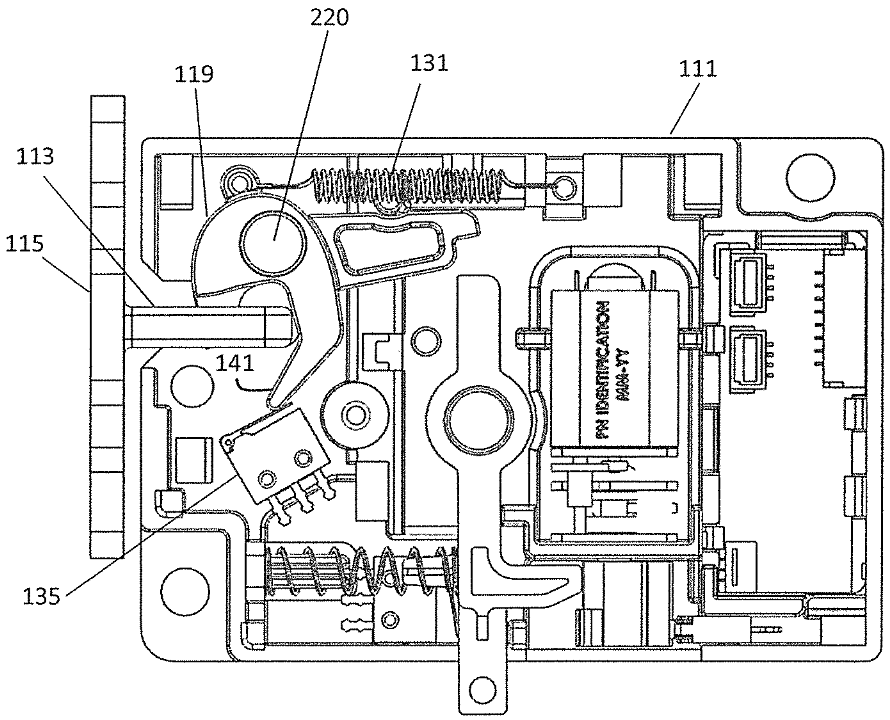
FIG. 2 is a view of the electro-mechanical latch/locking device of FIG. 1 with the catch or striker moved horizontally inward, relative to a cabinet for example, to bias a latch receiver, resulting in contact with the sensor in the direct path of a lower portion of the latch receiver.

FIG. 2 shows the device of FIG. 1, with the striker face plate 115 moved towards the lock mechanism, for example due to a user pressing on a drawer, inwardly with respect to a cabinet holding the drawer. This results contact between the striker and latch receiver, which changes the sensor state, which is monitored by a control circuit, for example a controller, of the electro-mechanical device. As in FIG. 1, wires are not shown that lead from the sensors and motor to the control circuit. As indicated in FIG. 2, as the striker 113 moves horizontally inward against the latch receiver, a gap 117 between the striker face plate 115 and the housing base 111 is decreased. The latch receiver 119 is urged to rotate by the striker 113 about a screw or rivet 220 by which the latch receiver is mounted to a base 111 of the lock mechanism as the striker moves horizontally inward. A latch spring 131 is coupled to the latch receiver 119 at a position approximately on the opposite side of the latch receiver 119 relative to the basin. The latch spring 131 is coupled at its other end to the housing base 111 via a stanchion or post extending therefrom to provide a counteraction to create a spring force when the latch receiver 119 is rotated to either the closed or engaging position, with the latch spring 131 therefore biasing (rotating) the latch receiver 119 to the open position. In some embodiments, the latch spring 131 has sufficient force to kick-out the inner slide member or drawer 115, providing an alternative open-assist mechanism compared to an open-assist spring (not shown), which may generally be used instead. As the latch receiver 119 is rotated by the inwardly moving striker 113, a distal portion of the second leg 141 engages a latch sensor 135 which changes the sensor state monitored by the control circuit 129 of the electro-mechanical latch/locking device, indicating that the drawer 115 should be opened. In the embodiment shown in FIG. 2, the latch sensor, which may also be termed a drawer switch, may be a switch, for example a micro switch. In some embodiments the latch sensor may be replaced with another sensor, which may be positioned in another location. For example, in some embodiments a sensor may be mounted to the drawer (or a door if the lock is used with the door). In such embodiments, for example, the sensor may be a contact sensor, indicating contact between the drawer (or door) and the cabinet face.

Figure 3:
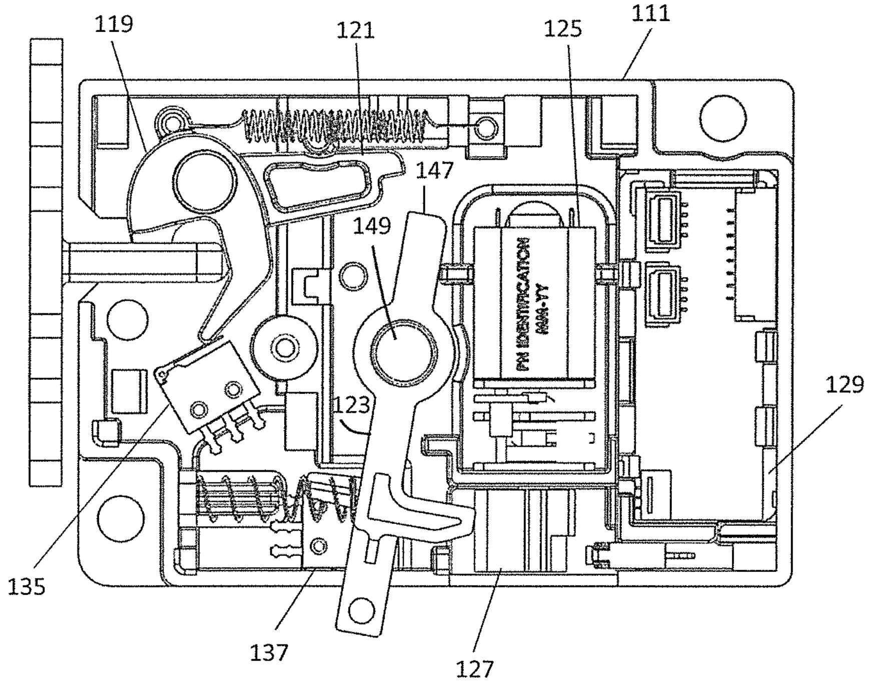
FIG. 3 is a view of the electro-mechanical latch/locking device of FIG. 1 with the catch or striker moved horizontally inward to bias the latch receiver, resulting in contact with the sensor in the direct path of the lower portion of the rotational catch.

FIG. 3 shows the device of FIG. 1, with the striker face plate positioned as in FIG. 2 and the lever arm moved to an unlocking position. As a result of the sensor changing state, as discussed with respect to FIG. 2, the control circuit commands the motor to activate and drive or bias a lever arm to an unlocking position. Again, wires are not shown that lead from the sensors and motor to the control circuit. As shown in FIG. 3, a control circuit, for example a microprocessor, which may be a digital signal processor, mounted to a circuit board 129, commands a motor 125 to activate and drive or bias the lever arm 123 away from the third leg 121, based on the latch sensor 135 changing state. In one embodiment, the motor 125 drives a motor cam 127 to rotate from a locking state by pressing or biasing the lever arm 123 to rotate about a screw or rivet 149 attached to the housing base 111 to an unlocking position. As the lever arm 123 is rotated by the motor cam 127, a second end of the lever arm engages an optical lever arm sensor 137. The second end can be directly opposite the first end 147 with the rivet 149 between, directly between in some embodiments, the two ends. The contact with the lever arm sensor 137 indicates that the lever arm 123 has rotated to the unlocking position, which is a certain point away from a rotational path of the third leg 121 of the latch receiver 119.

Figure 4:
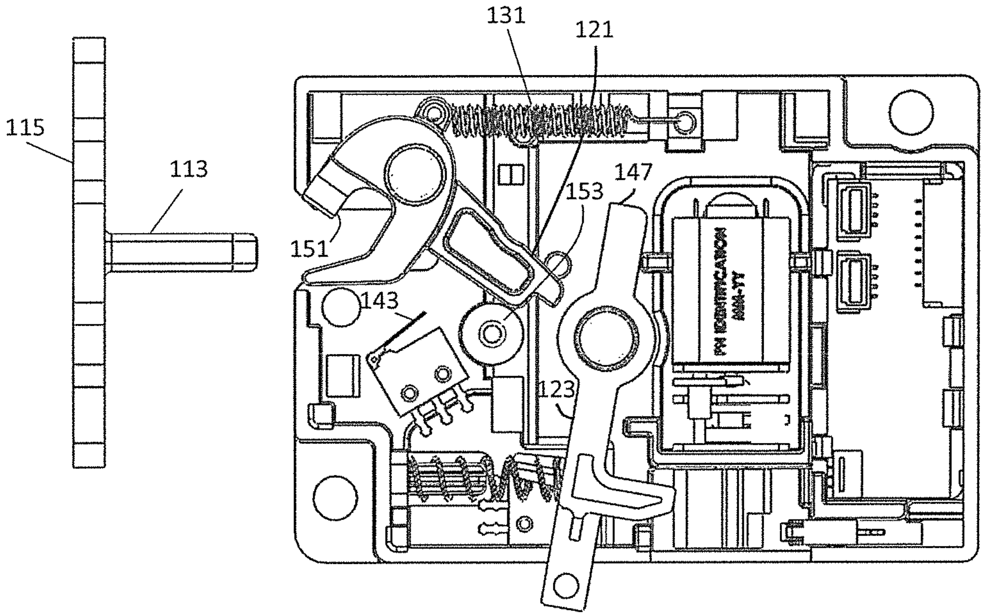
FIG. 4 is a view of the electro-mechanical latch/locking device of FIG. 3 with the catch or striker moved horizontally away from the electro-mechanical device resulting in the release of catch or striker from the latch receiver, and removing contact with the sensor in the direct path of the lower portion of the latch receiver.

Referring to FIG. 4, the striker 113 effectively coupled to the drawer can be moved away from the electro-mechanical latch/locking device, resulting in release of the striker 113 from the first leg 151, and removing contact of the latch receiver with the latch sensor 143. This removal of contact changes the sensor state, which is monitored by the control circuit of the electro-mechanical device. Again, wires are not shown that lead from the sensors and motor to the control circuit. With the first end 147 of the lever arm 123 rotated away from the path of the third leg 121, the latch spring 131 can rotate the latch receiver to the open position as the striker 113 moves away.

A bumper 153 is positioned to engage the third leg 121 of the latch receiver 119 when the latch receiver 119 is in the open position. Preferably the bumper 153 includes a soft compliant shell, for example of rubber, to reduce noise generated by contact of the third leg 121 and the bumper 153. The bumper 153 is positioned such that its engagement with the third leg 121 counters the bias from the latch spring 131 to cause the latch receiver 119 to stop rotating as the basin is positioned to receive the striker 113. The constant biasing of the latch receiver 119 by the latch spring 131 and the counteraction of this bias by the third leg 121 against the bumper 153 ensures that the latch receiver 119 is held in place and does not inadvertently move out of position.

Figure 5:
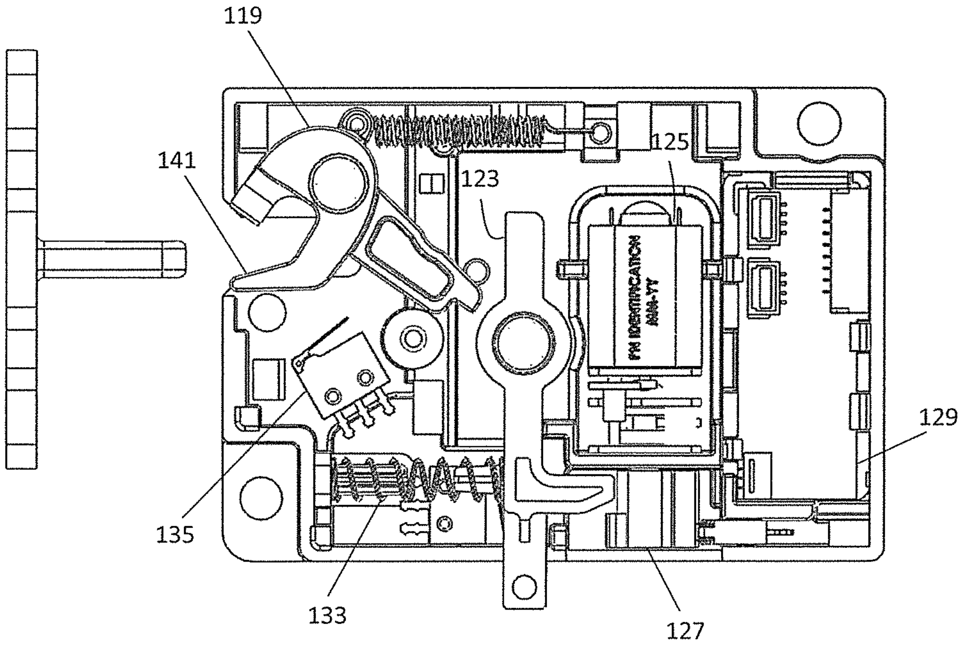
FIG. 5 is a further view of the electro-mechanical latch/locking device of FIG. 4 with the catch or striker moved horizontally away from the electro-mechanical device.

Referring to FIG. 5, after a predetermined time period or immediately after removing the contact between the latch sensor 135 and the first leg 141 of the latch receiver 119, the latch sensor changes the sensor state. The sensor state is monitored by the onboard control circuit, for example mounted to the circuit board 129. As a result of the sensor state change, the onboard control circuit commands the motor 125 to return the motor cam 127 to the unbiased, or locking, state. A lever arm spring 133 normally biases the lever arm 123 to the locking position, and with the motor cam in the locking state, the lever arm spring biases the lever arm to the locking position. As in other FIGs., in FIG. 5 wires are not shown that lead from the sensors and motor to the control circuit.

Figure 6:
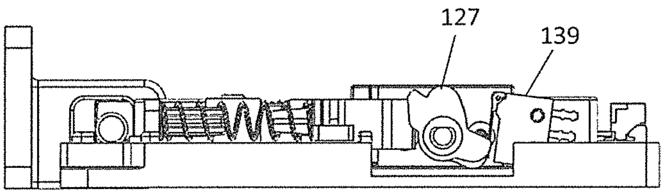
FIG. 6 is a view of the device of FIGS. 1-5 illustrating a motor cam and motor positional sensor.

Referring to FIG. 6, the motor cam 127 is in contact with a motor cam switch 139, indicating that the motor cam is in the unbiased state. The motor cam 127 is shaped such that as the motor cam 127 rotates, simultaneously the lever arm is biased by the motor cam, and contact with the motor cam switch is removed.

Figure 7B:
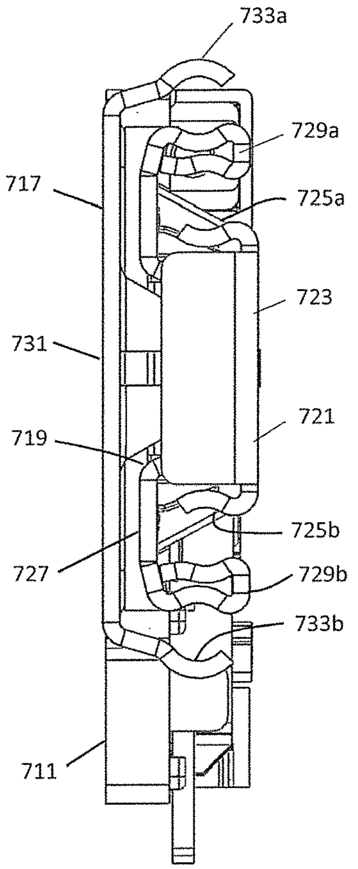
FIG. 7B is a front view of the telescopic drawer slide coupled to a lock of FIG. 7A in accordance with aspects of the invention
Figure 7A:
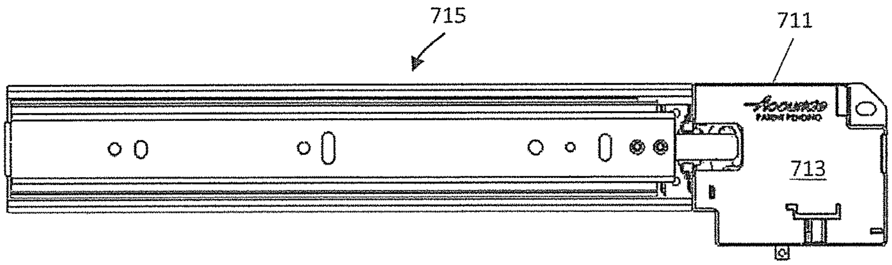
FIG. 7A is a view of an alternate embodiment of the electro-mechanical latch/locking device integrated to a telescopic slide.

FIG. 7A is a side view of a lock mechanism 711 in accordance with aspects of the invention coupled to a telescopic drawer slide 715. The lock mechanism in various embodiments is the same as, or similar to, the lock mechanism of FIG. 1, or lock mechanisms elsewhere discussed herein. The internal mechanism of the device is similar to that of the device of FIG. 1. The device, however, is physically joined to the slide. The catch or striker is also integrated with the slide, and in positional alignment with the latch receiver of the device. The lock mechanism, as shown, includes a cover 713. The cover may be used, for example, with the lock mechanism of FIG. 1.

As illustrated in FIG. 7A, the lock mechanism is mounted to a rear of the telescopic drawer slide. As may be seen in the front view of FIG. 7B, the telescopic drawer slide includes an outer slide member 717, an intermediate slide member 719, and an inner slide member 721, with the lock mechanism 711 coupled to a rear of the outer slide member.

The inner slide member includes a longitudinal web 723, which is longitudinally hounded by arcuate raceways 725*a*, *b*. Although not shown, generally bearings run in the arcuate raceways. The intermediate slide member similarly has a generally longitudinal web 727 (with and indention in its middle to allow for mounting hardware), also longitudinally bounded by arcuate raceways 729*a,b*, with the inner slide member nested within the arcuate raceways 729*a,b*. The arcuate raceways of the intermediate slide member face both towards the inner slide member and the outer slide member for, as may be expected, the intermediate slide member is nested within arcuate raceways 733*a,b* of the outer slide member, with the arcuate raceways 733*a,b* longitudinally bounding a longitudinal web 731 of the outer slide member. In operation the inner slide member may be extended from the intermediate slide member, and the intermediate slide member from the outer slide member, all in a telescopic fashion. Of course, in some embodiments the telescopic drawer slide instead may be a two member drawer slide, with the intermediate slide member omitted.

Figure 8:
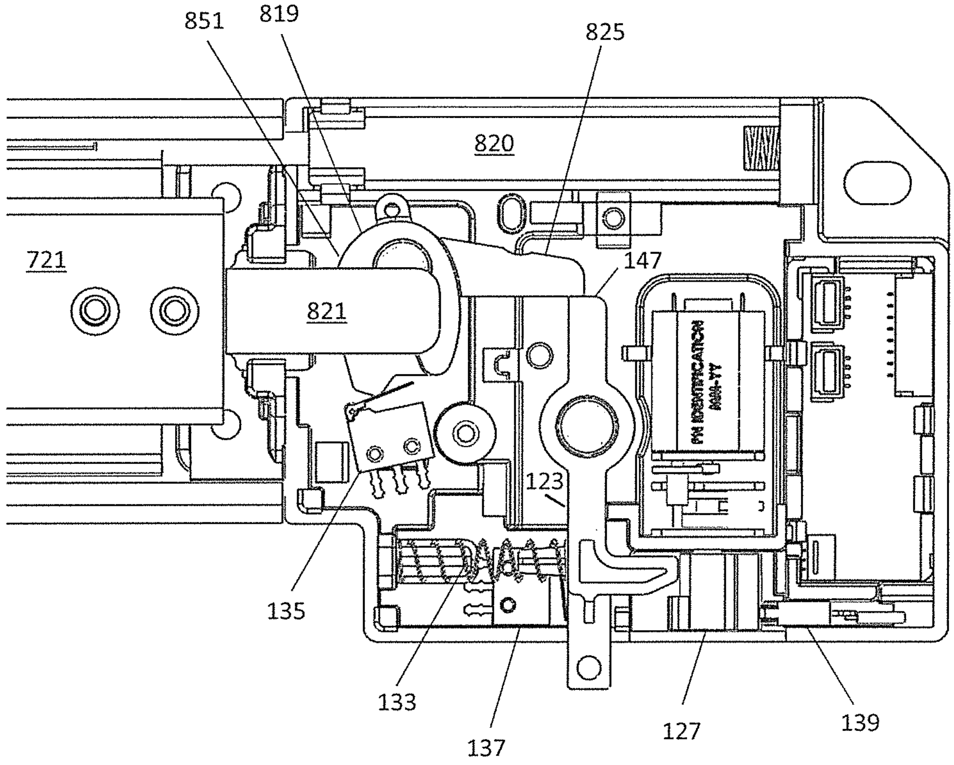
FIG. 8 is a close up view of the electro-mechanical latch/locking device of FIG. 7A with a cover removed for clarity of the internal mechanism

FIG. 8 illustrates a close up view of the locking mechanism, or electro-mechanical latch/locking device of FIG. 7A, with the cover and the latch spring removed for clarity. The device is shown in the latched/locked position. In this image wires are not shown that lead from the sensors and motor to the control circuit. Also, a latch receiver spring for normally biasing the latch receiver to a locking position is not shown. In FIG. 8, a tab 821 extends from the inner slide member 721, with a pin protruding from the tab, with the pin not visible as it protrudes from a side of the tab not visible in FIG. 8. In the locked position, the pin 821 is engaged with a first leg 851 of the latch receiver 819 and the third leg 825 is resisting against the first end 147 of the lever arm 123. A tip, or flange, of the latch receiver 819 is slightly contacting or about to contact the latch sensor 135, but without changing its state, and the motor cam 127 is contacting the motor cam sensor 139. In addition, FIG. 8 also shows an open-assist mechanism, which for example includes a spring, with the open-assist mechanism normally biasing the inner slide member to an open position.

Figure 9:
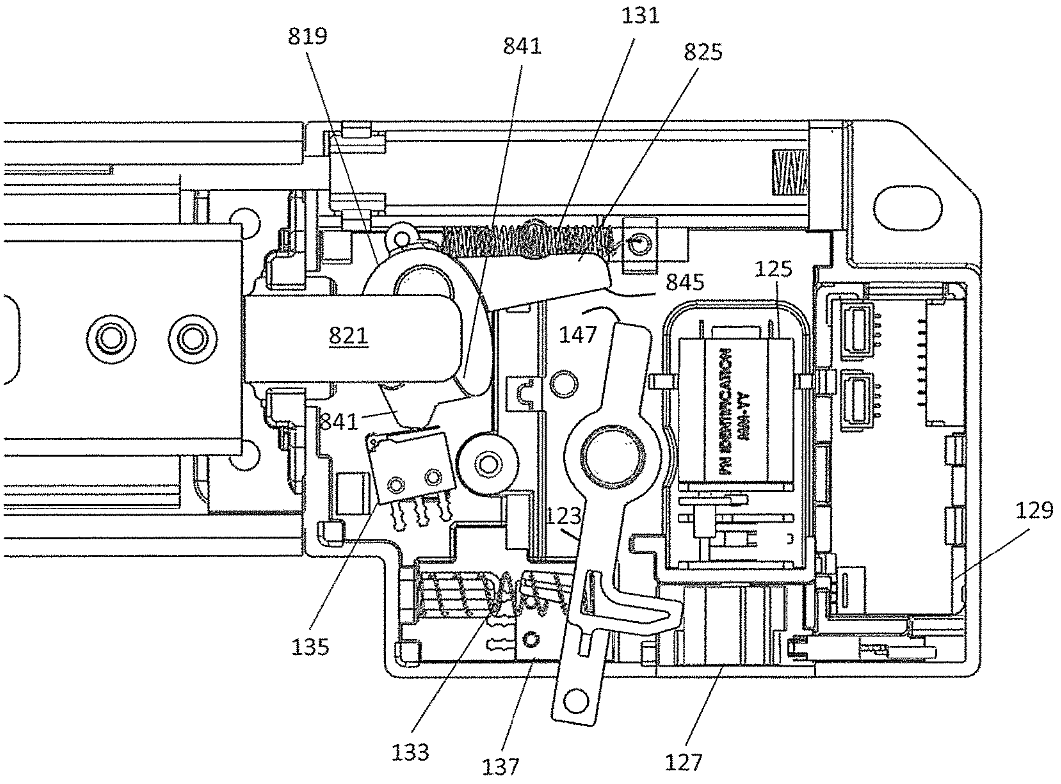
FIG. 9 is a view of the electro-mechanical latch/locking device of FIG. 8 with the catch or striker moved horizontally inward to bias the latch receiver, resulting in contact with the sensor in the direct path of the lower portion of the latch receiver.

Referring to FIG. 9, to open the drawer, the drawer or the drawer slide member of the drawer is pushed inward, decreasing a gap between the closed position and the engaging position. The pin 821 attached to the tab of the inner slide member biases the second leg 841 causing the latch receiver 819 to rotate against the spring force of the latch spring 131, as the drawer is pushed inward. The tip of the latch receiver 819 contacts and depresses a switch of the latch sensor 135 triggering a signal to the onboard control circuit to operate the motor 125. Depression of the switch changes the sensor state which is monitored by the control circuit of the electro-mechanical device. As a result of the sensor changing state the control circuit commands the motor to activate and drive or bias the rotational vertical lever arm. As in other FIGs., wires are not shown that lead from the sensors and motor to the control circuit. The motor 125 rotates the motor cam 127 from an unbiased state to a biased state. The motor cam 127 biases against and rotates the lever arm 123 against an opposing spring force from the lever arm spring 133, until the lever arm 133 contacts the lever arm sensor 137, with the lever arm in the unlocking position. The lever arms sensor 137 sends a signal to the onboard control circuit 129 to stop the motor cam 127 from rotating further and maintain the lever arm 123 in the unlocking position away from the travel path of the third leg 825.

Figure 10:
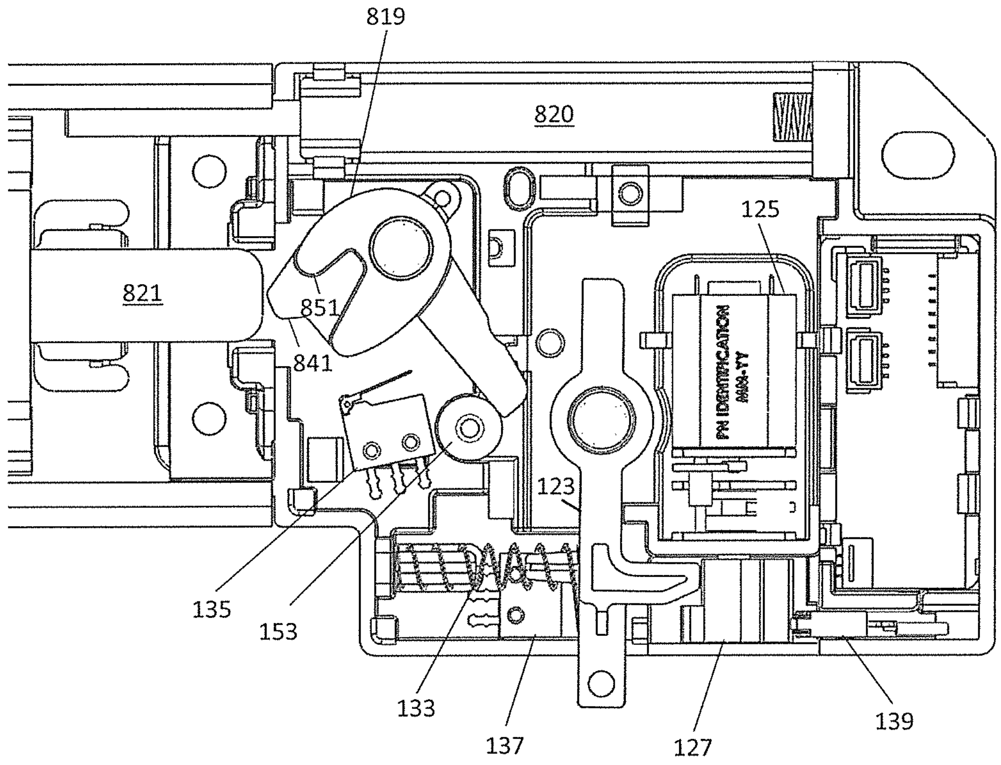
FIG. 10 is a further view of the electro-mechanical latch/locking device of FIG. 8 with the catch or striker moved horizontally away from the electro-mechanical device.

Referring to FIG. 10, with the latch receiver positioned out of the way of the pin on the tab extending from the inner slide member (to which the drawer is connected), the drawer can now be pulled out and opened thereby moving the striker 821 outward away from the latch receiver 819. In the embodiment shown, however, an open-assist mechanism 820, for example including a spring, normally biases the inner slide member, and hence the drawer, to an open position. The open-assist mechanism is, in some embodiments, a spring bias mechanism used to propel the catch or striker away from the latch receiver when the lever arm is biased as in FIG. 9 to an unlocking position. With the striker outward away from the latch, the latch receiver 819 rotates into an open position under the spring force of the latch spring to receive the striker 821 when the drawer is closed. The latch receiver 819 is pressed against the bumper 153 in the open position under the spring force of the latch spring. As the latch receiver 819 rotates into the open S position, contact with the latch sensor 135 is removed thereby sending a signal to the onboard control circuit to operate the motor 125 and return the motor cam 127 back to the unbiased state until the motor cam 127 contacts the motor cam sensor 139. The lever arm 123 is in constant contact with the motor cam 127 under the spring force of the lever arm spring 133, as the motor cam 127 rotates from the biased state. The lever arm 123 rotates back to the locking position and the contact with lever arm switch 137 is removed.

Referring back to FIG. 8, when the drawer is closed or returned back to the cabinet, the pin 821 biases against the latch receiver 819, thereby rotating the latch receiver until the third leg rests against the first end 147 of the lever arm 123 and the striker 821 reengages with the first leg 851 of the latch receiver 819. Because the lever arm 123 is in the travel path of the third leg, as the third leg 825 swings back into the closed position, the third leg 825 contacts and rotates the lever arm 123. In many embodiments, rotation of the lever arm causes the lever arm to contact the lever arm sensor 137. When the third leg 825 is reaches at least to the closed position, the lever arm rotates under the spring force of the lever arm spring 133 to the locking position to prevent the third leg 825 from rotating and preventing the pin 821 from detaching from the engagement with the first leg 851. With rotation of the lever arm, the lever arm is no longer in contact with the lever arm switch 137, with the lever arm switch indicating that the lever arm is in the locking position. In some embodiments the controller may monitor states of the lever arm switch to determine if the lever arm has been unexpectedly moved to the unlocking position, which may be an indication of tampering with the lock mechanism. In some embodiments, which may be applied to any of the embodiments discussed herein, the latch sensor, or other sensor in some embodiments, may indicate that the latch receiver is in a locked position. In such embodiments, the control circuit may determine an indication of whether the latch receiver is securely in the locked position, for example based on information from all of the latch sensor, lever arm switch, and the motor cam switch. In some embodiments the control circuit determines that the latch receiver is securely in the locked position only when the latch sensor indicates the latch receiver is in the locked position, the lever arm switch determines that the lever arm is in the locking position, and the motor cam switch determines that the motor cam is in the unbiased state (e.g. that the motor is in a state allowing for the lever arm to be in the locking position). In some embodiments the control circuit stores an indication of whether the latch receiver is secured in the locking position, and in some embodiments the control circuit transmits the indication to another computer unit, for example one performing supervisory functions relating to the cabinetry.

Figure 11B:
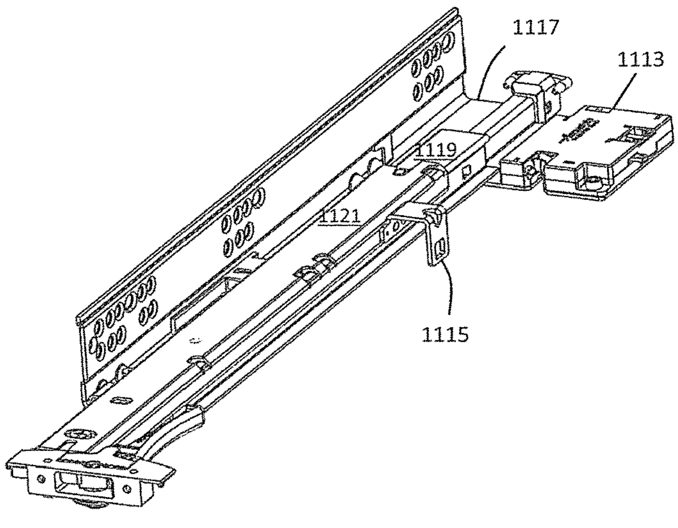
FIG. 11B shows the electro-mechanical device of FIG. 1 coupled to the undermount slide of FIG. 11A, with the undermount slide in a partially extended position.
Figure 11A:
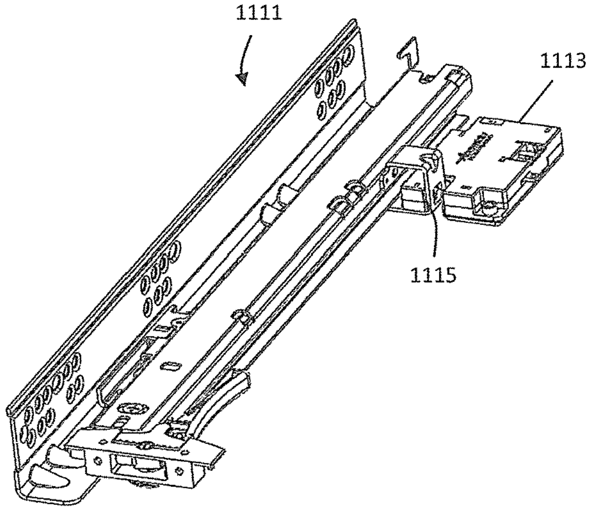
FIG. 11A is an isometric projection view of the electro-mechanical device shown in FIG. 1 physically attached to a left hand slide typically described as an under mounted or bottom mount slide.

FIG. 11A shows an undermount drawer slide 1111 with a lock mechanism 1113 in accordance with aspects of the invention. The lock mechanism may be, for example, the lock mechanism as discussed with respect to FIG. 1, or the same as or similar to the lock mechanism elsewhere discussed herein. In FIG. 11A, the lock mechanism engages a striker or catch 1115 mounted to the undermount drawer slide. IN FIG. 11A the lock mechanism is engaged with the striker. The catch or striker is also integrated and in positional alignment with the latch receiver of this device. The device in this FIG. may also use an optional spring bias mechanism used to propel the catch or striker away for the rotational catch when the vertical lever is biased as in FIG. 4.

FIG. 11B shows the undermount drawer slide and lock mechanism 1113, with the striker free of the lock mechanism and the undermount drawer slide in a partially extended state. With the undermount drawer slide in the partially extended state, it may be seen that the lock mechanism is mounted to a cabinet member 1117 of the undermount drawer slide. The cabinet member includes a flange for mounting to a side wall or structure of a cabinet, with the flange extending out from a longitudinal side of a body of the cabinet member. The lock mechanism is mounted about a rear of the cabinet member. An intermediate slide member 1119 is slidably extendable, and in FIG. 11B slightly extended from the cabinet member. A drawer slide member 1121 is, in turn, slidably extendable, and in FIG. 11B slightly extended from the intermediate slide member, with a drawer (not shown) generally mounted to the drawer slide member. In the embodiment of FIG. 11B, the striker 1115 is formed of an L-bracket mounted to the drawer slide member.

Figure 12:
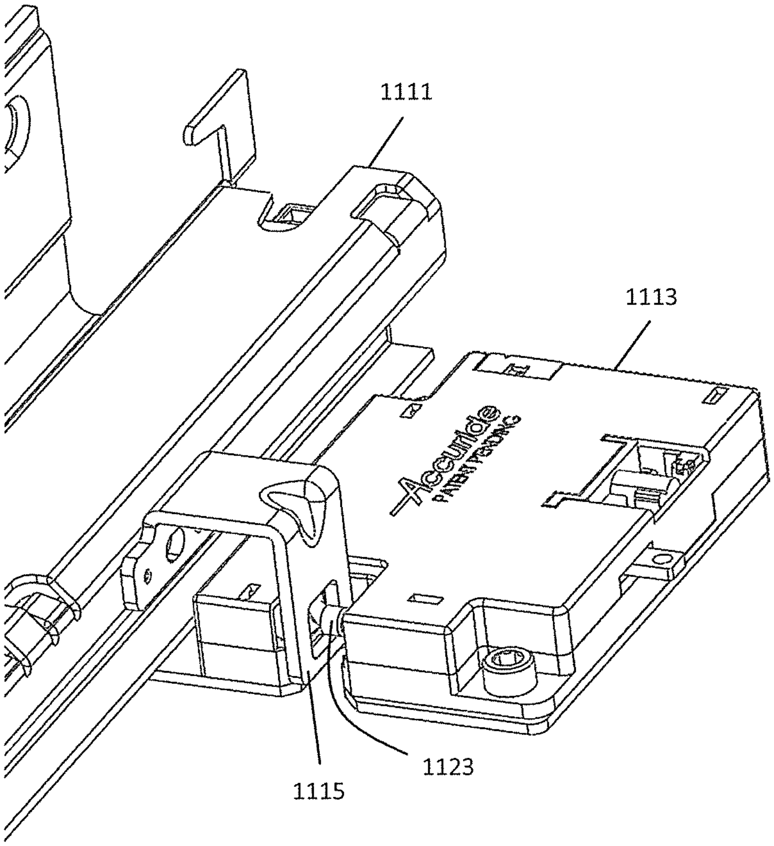
FIG. 12 is isometric projection close up view of the electro-mechanical device shown in FIG. 11.

FIG. 12 shows a further view of portions of the undermount drawer slide 1111 with lock mechanism 1113 of FIG. 11A. In FIG. 12 it may be seen that the striker 1115 is within a cutout of the housing of the lock mechanism, and a tooth 1123 of the lock mechanism has engaged the striker, and therefore locked the drawer slide member in a closed position, by passing through an aperture of the striker. The tooth 1123 may be a tooth of a latch receiver of the lock mechanism. Accordingly, the device is in the latched and locked position. The catch or striker is fully captured by the rotational latch receiver of the device.

Figure 13:
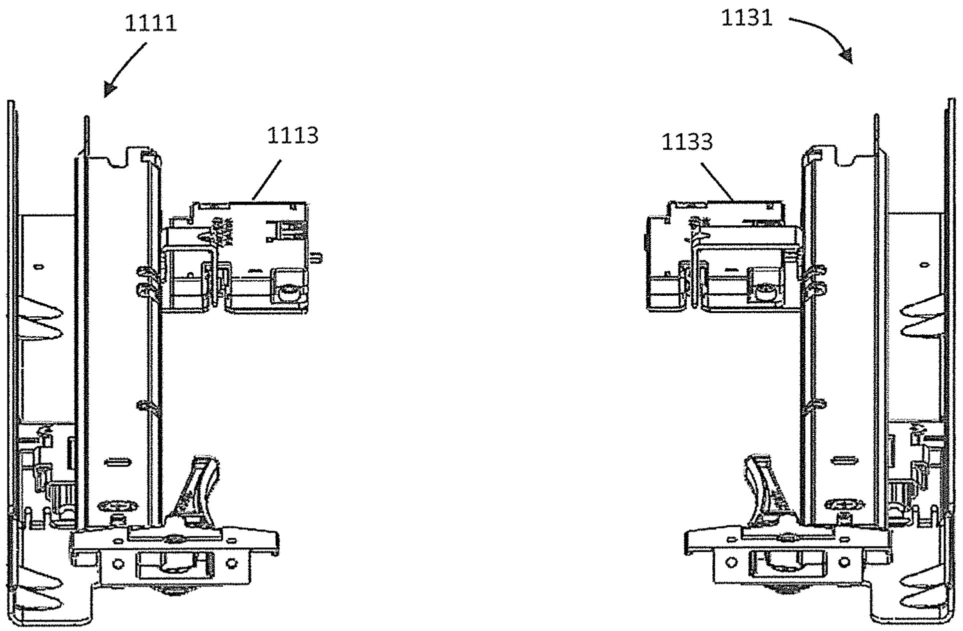
FIG. 13 is a perspective view of the slide and device shown in FIG. 11B with a secondary electro-mechanical device physically connected to the opposite right hand slide.
Figure 14:
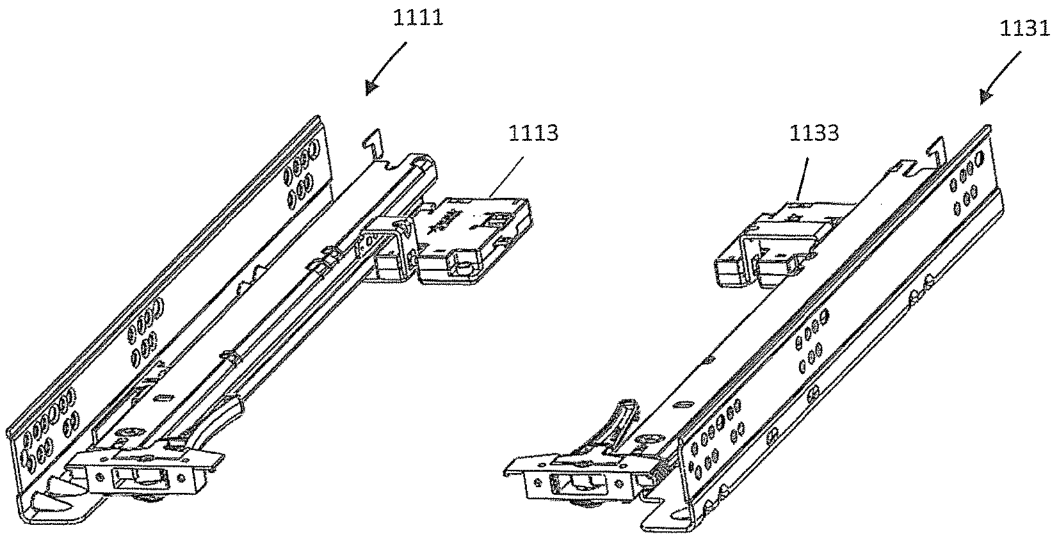
FIG. 14 is an isometric projection view of the devices shown in FIG. 13.

FIGS. 13 and 14 show views from different angles of a pair of undermount slide members 1111, 1131 with corresponding lock mechanisms 1113, 1133. The undermount slide member 1111 and associated lock mechanism 1113 are as discussed with respect to FIGS. 11A-B and 12. The undermount slide member 1131 and lock mechanism 1133 are mirrored versions of the undermount slide member 1111 and lock mechanism 1113, and are positioned parallel to the undermount slide member 1111 and lock mechanism 1113, as they would be if these items were positioned at opposite sides of a cabinet to extendably support a drawer of the cabinet. These slides work in synchronization when activated to provide duality of latching and locking.

In such an embodiment two lock mechanisms may lock the drawer within the cabinet. In such an embodiment control circuitry of the two lock mechanisms may communicate with each other, either by way of wired communications or wireless communications, so as to be able to coordinate their actions. For example, depending on drawer width, and possibly other factors, one side of the drawer may be pressed inward in the cabinet, to an extent noticeable by a sensor of the lock mechanism such as a drawer switch, without the other side of the drawer being so sufficiently moved. In such a circumstance, the lock mechanism which has had a sensor indicate pressing in of the drawer may communicate that information to the other lock mechanism, or a central controller, so that both lock mechanisms may unlock (or lock as the case may be).

Figure 15:
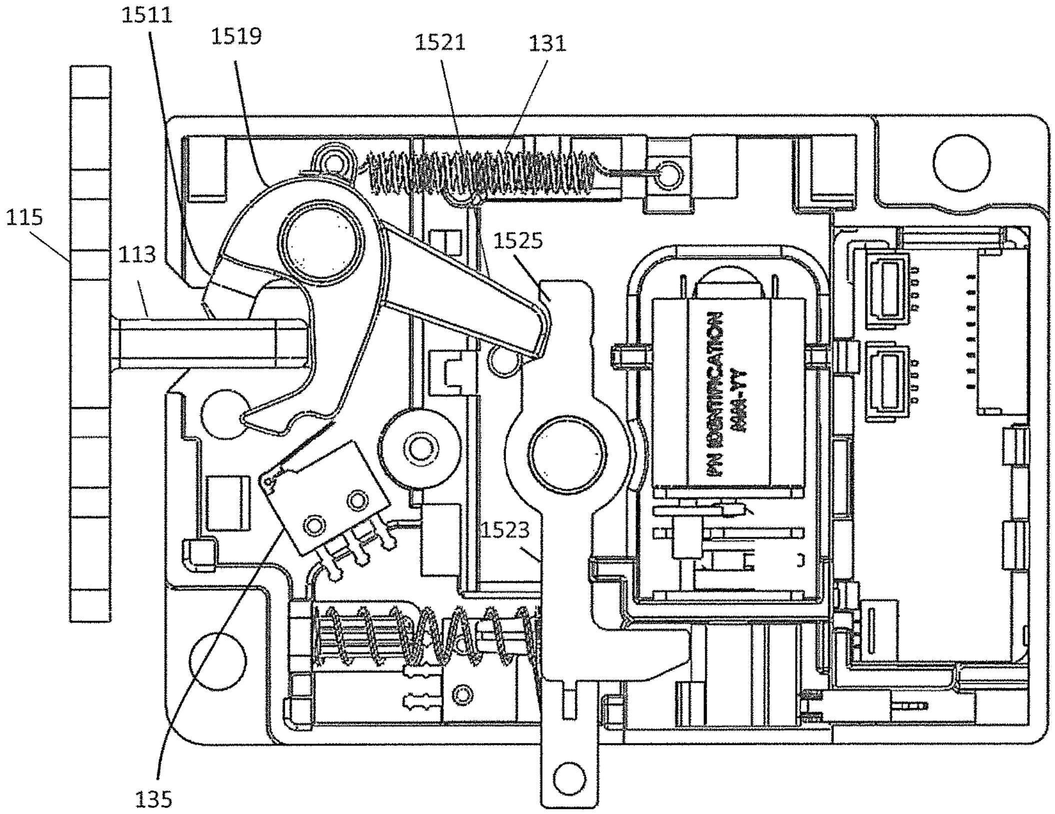
FIG. 15 is a view of the stand alone electro-mechanical device with a modified lever arm with a secondary nesting position for the latch receiver.

FIG. 15 illustrates yet another embodiment of the electro-mechanical latch/locking device. The electro-mechanical latch/locking device of FIG. 15 is similar to the electro-mechanical latch/locking device of FIG. 1 and FIG. 8, except that in the closed position the latch receiver 1519 is contacting the latch sensor 135, the latch receiver 1519 is different, and cutouts are provided in the latch receiver 1519 and lever arm 1523 to accommodate a secondary nesting position. The secondary nesting position provides for a secure latch when the catch or striker 113 has not been fully displaced a sufficient distance to position the third leg 1521 of the latch receiver 1519 above the first end 1525 of the lever arm 1523, in the locking position. In the illustrated embodiment, the third leg 1521 is resting against the cutout of the lever arm 1523 is unable to rotate in the direction under the spring force of the latch spring 131. Furthermore, the engagement between the striker 113 and the first leg 1511 is sufficient to prevent the striker 113 from disengaging from the first leg 1511. The cutout in the latch receiver 1519 prevents the latch receiver from contacting the latch sensor 135 until the latch receiver has rotated a sufficient amount to place the third leg of the latch receiver over the top of the lever arm, to ensure the latch sensor does not inappropriately indicate that the latch receiver is in a locked (by the lever arm) position. The cutout in the lever arm, however, allows for some locking of the mechanism if the drawer has not been fully pressed in, even if the locking is possibly not as secure as that provided when the third leg is over the lever arm.

Figure 16:
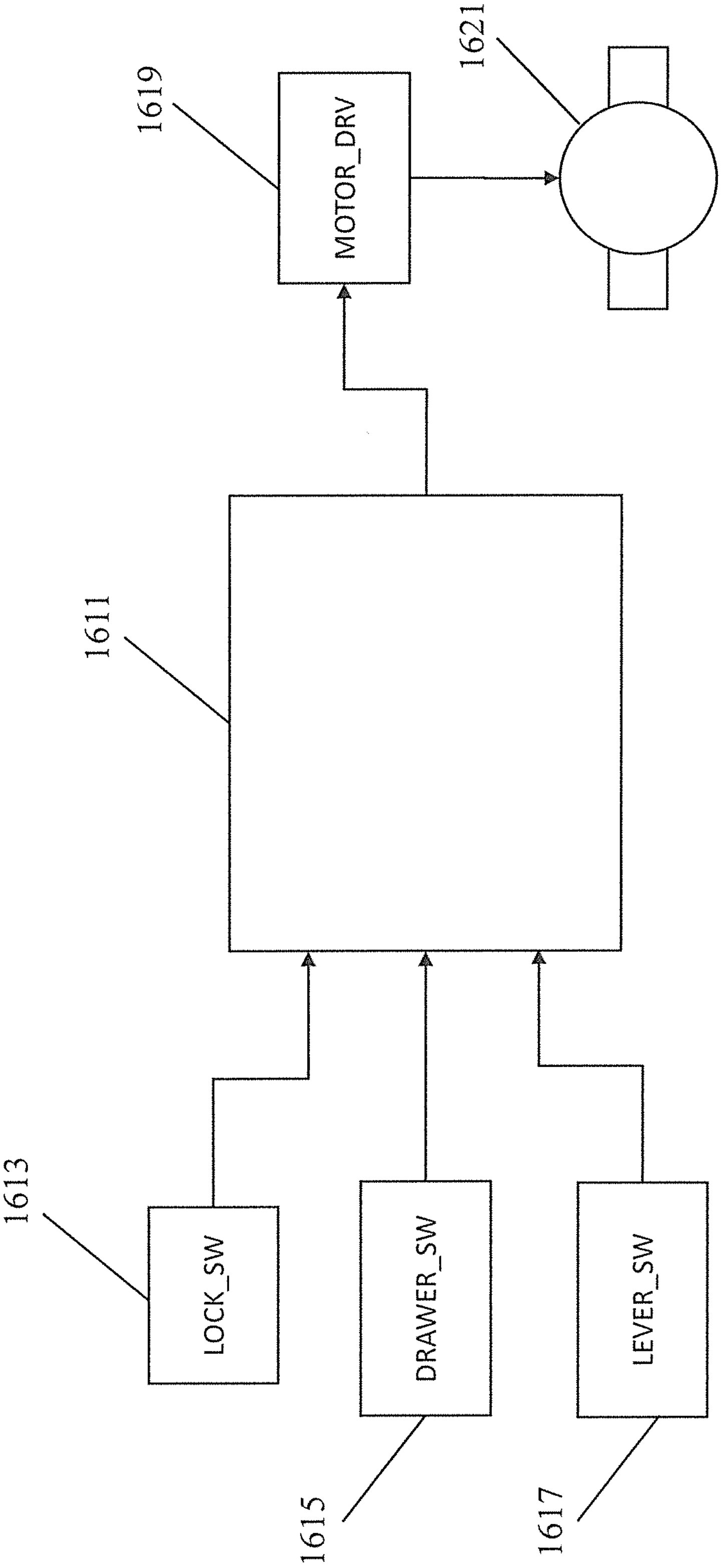
FIG. 16 is a block diagram showing portions of the circuitry for controlling an electro-mechanical latch/locking device in accordance with aspects of the invention

FIG. 16 is a block diagram showing portions of the circuitry for controlling an electro-mechanical latch/locking device in accordance with aspects of the invention. As shown in FIG. 16, the circuitry includes a microcontroller 1611, lock sensor or switch 1613, drawer sensor or switch 1615, lever sensor or switch 1617, motor driver 1619, and motor 1621.

The microcontroller 1611 generally processes program instructions for controlling the electro-mechanical latch/locking device. As shown in FIG. 16, the microcontroller is coupled to the lock switch, the drawer switch, the lever switch and the motor driver, with the motor driver coupled to the motor. In some embodiments, input pins of the microcontroller are configured to map to pins of the lock switch, the drawer switch, and the lever switch. In some embodiments, output pins of the microcontroller is configured to map to pins of the motor driver.

The lever arm switch and/or the lock switch may be used to determine whether or not tamper has occurred. For example, a tamper may be detected based on activation and deactivation sequences of the lever arm switch and/or the lock switch. In some embodiments, once a tamper is detected the microcontroller may perform a reaction or series of reactions in response to the tamper.

In some embodiments, the drawer switch is used for locking and unlocking operations of the electro-mechanical latch/locking device. In some embodiments when a catch or striker moves a latch receiver of the electro-mechanical latch/locking device, the drawer switch may be activated sending the microcontroller a signal. The microcontroller registers the signal and commands the motor driver which in turn activates the motor to rotate in a direction to displace a lever arm that secures the latch receiver. As a result, the latch receiver may move freely, and may unlock and release the catch or striker allowing a drawer of a cabinet to open. Once the catch or striker is released, the microcontroller may command the motor (via the motor driver) to rotate the lever arm back to its original position. In some embodiments when a user pushes inward to close the drawer of the cabinet, the catch or striker moves horizontally inward to push the latch receiver inward causing the drawer switch to activate. Once again, a signal is transmitted from the drawer switch to the microcontroller. In some embodiments, the microcontroller may be programmed to control a predefined time to confirm activation command by the drawer switch and a predefined time the motor is commanded to rotate by the motor driver. In some embodiments, the microcontroller may be programmed to update a variable that tracks status of the drawer switch.

In some embodiments the lever switch may be used to indicate whether the lever arm is positioned at its original, latched and locked position. As previously indicated, when performing the unlocking operation, the lever arm is displaced to allow the latch receiver to move freely and release the catch or striker. The displacement of the lever arm, for example, may activate the lever switch sending a signal to the microcontroller indicating that the lever arm is not in its original, latched and locked position. As a result, the microcontroller registers such signal and commands the motor to rotate the lever arm to its original position. The rotation of the lever arm causes an end of the lever arm to move horizontally inward deactivating the lever switch as a result. Deactivating the lever switch transmits a signal to the microcontroller indicating that the lever arm is in its original, latched and locked position.

Figure 17:
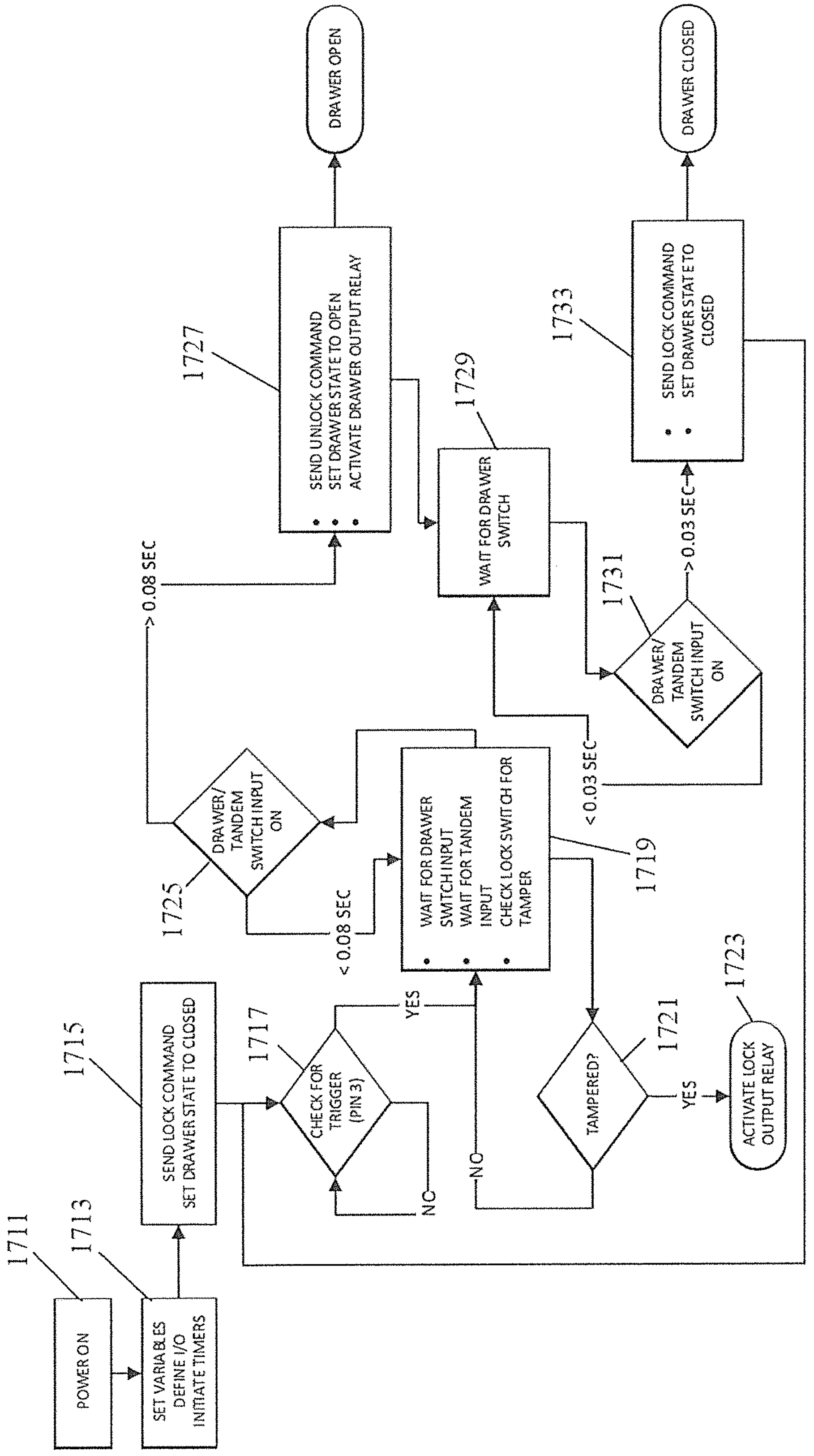
FIG. 17 is a flow diagram illustrating a process for controlling an electro-mechanical latch/locking device in accordance with aspects of the invention.

FIG. 17 is a flow diagram illustrating a process for controlling an electro-mechanical latch/locking device in accordance with aspects of the invention. The process is generally performed by control circuitry, which may be a microcontroller or a microprocessor. In one embodiment, the process is performed by the circuitry shown in FIG. 16. In another embodiment, the process is performed by electronic circuitry. At block 1711, the electro-mechanical latch/locking device is powered on. The process then continues to block 1713.

At block 1713 the process sets variables, performs input/output mapping, and initiates timers. The process, for example, may perform initialization of the variables by assigning initial values to the variables. In addition, the process may define constants by assigning predefined values to the constants. For example, the process may assign a predefined value of 80 milliseconds to an open de-bounce time constant and 30 milliseconds to a close de-bounce time constant. Referring to FIG. 16, the process for example may perform input mapping by assigning input pins of the microcontroller 1611 to the lock switch 1613, the drawer switch 1615, and the lever switch 1617 respectively. Moreover, the process may perform output mapping by assigning an output pin of microcontroller 1611 to the motor driver 1619. In some embodiments, the process initiates the timers by assigning initial values to the timers and sending commands to start the timers. The process then continues to block 1715.

At block 1715, the process sends a command to ensure initial state of a drawer or door is known. In some embodiments, the process sends a CLOSED command to a motor driver, for example the motor driver 1619 shown in FIG. 16, and subsequently sets a variable that keeps track of the drawer or door to CLOSED. The process then continues to block 1717.

At block 1717 the process determines whether or not a trigger is active. In some embodiments, the trigger may be activated by a device equipped with a keypad, RFID reader, biometric, near field communication (NFC), or any other device used to authenticate user access. For example, the trigger may be activated when the device is in proximity with the electro-mechanical latch/locking device. Upon activation of the trigger, a signal may be received at a trigger input to indicate that the trigger is active. Once the trigger is active, the process continues to block 1719. Otherwise, the process returns to block 1717.

At block 1719, the process waits for a drawer switch or a tandem switch to activate. The use of two switches, e.g. the drawer switch and the tandem switch, in the alternative may be useful, for example, if a drawer is sufficiently wide that it is possible that only a portion of a drawer may be pressed inwardly by a user. The drawer switch or the tandem switch, for example, may be activated when a catch or striker of the electro-mechanical latch/locking device moves horizontally inward to bias a rotational catch inward resulting in activation of the drawer switch or the tandem switch. In addition, the process may monitor a lock switch for tamper. The process, for example, may determine that tamper has occurred based on a sequence of activation and deactivation of the lock switch. The process then proceeds to blocks 1721 and 1725.

At block 1721, the process determines whether or not the electro-mechanical device has been tampered. If tamper has occurred, the process proceeds to block 1723. Otherwise, the process returns to block 1719.

At block 1723, the process activates a lock output relay.

At block 1725, the process determines whether or not drawer switch or tandem switch of the electro-mechanical device has been continuously activated for at least a fixed duration. In some embodiments, the fixed duration is 0.08 second or 80 milliseconds. In some embodiments the drawer switch is a switch that indicates whether or not a drawer has been pressed inward into a cabinet. In some embodiments the tandem switch also indicates whether or not the drawer has been pressed inward into the cabinet. If the drawer switch or the tandem switch has been continuously activated for at least the fixed duration, the process proceeds to block 1727. Otherwise, the process returns to block 1719.

At block 1727, the process sends a command to unlock and open the drawer or door. The process, for example, may send an OPEN command to a motor driver (e.g., the motor driver 1619 shown in FIG. 16) and set the variable that keeps track of the drawer or door to OPEN. Once the motor driver receives the OPEN command, the motor driver activates a drawer output relay to command a motor, for example motor 1621 shown in FIG. 16, to rotate in a proper direction to release and open the drawer or door. In some embodiments, the activation of the drawer output relay causes the motor to rotate in a direction to displace a lever arm that secures a latch receiver such that the top of the lever arm does not block the latch receiver. Once a cam of the motor has displaced the lever arm, the latch receiver is free to move and release the catch or striker allowing the drawer or door to open. The process then sends a command to the motor driver to rotate the motor in a direction such that the lever arm is returned to its original position, for example the top of the lever arm is in a position to block the latch receiver, and awaits the latch receiver. The latch receiver is then biased by the catch or striker to move it back to the latched and locked position. In some embodiments, the drawer or door is released and opened when the catch or striker moved horizontally away from the electro-mechanical device resulting in release of the catch or striker with the rotational catch and removing contact with the drawer switch in a direct path of a lower portion of the rotational catch. The drawer thereafter is opened and the process continues to block 1729.

At block 1729, the process waits for the drawer switch to activate. The drawer switch for example may be drawer switch 1615 shown in FIG. 16. In some embodiments, the drawer switch is activated when the drawer or door is pushed in causing the catch or striker to move horizontally inward to bias the latch receiver inward resulting in contact with the drawer switch in the direct path of the lower portion of the rotational catch. The process then proceeds to block 1731.

At block 1731, the process determines whether or not the drawer switch or the tandem switch of the electro-mechanical device has been continuously activated for at least a fixed duration. In some embodiments, the fixed duration is 0.03 second or 30 milliseconds. If the drawer switch or the tandem switch has been continuously activated for at least the fixed duration, the process proceeds to block 1733. Otherwise, the process returns to block 1729.

At block 1733, the process sends a command to close the drawer or door. The process, for example, may send a CLOSED command to the motor driver and set the variable that keeps track of the drawer or door to CLOSED. The drawer or door thereafter is closed.

Figure 18:
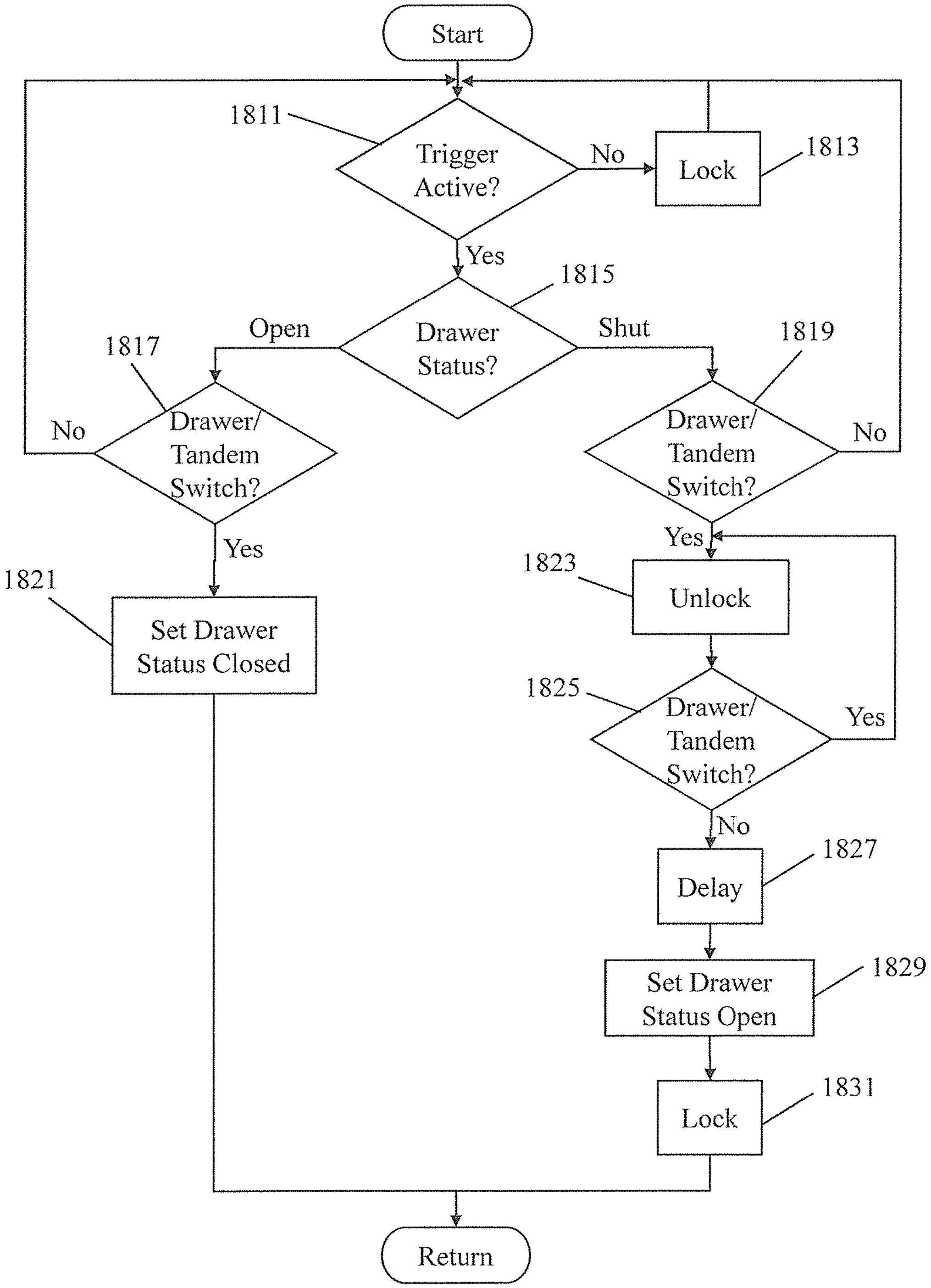
FIG. 18 is a flow diagram illustrating a process for controlling an electro-mechanical latching and locking device in accordance with aspects of the invention.

FIG. 18 is a flow diagram illustrating a process for controlling an electro-mechanical latching and locking device in accordance with aspects of the invention. The process is generally performed by a microcontroller or a microprocessor. In one embodiment, the process may be performed by the circuitry shown in FIG. 16. In another embodiment, the process may be performed by electronic circuitry.

At block 1811, the process determines whether or not a trigger is active. In some embodiments, the trigger may be activated by a device equipped with a keypad, RFID reader, biometric, near field communication (NFC), or any other device used to authenticate user access. For example, the trigger may be activated when the device is in proximity with the electro-mechanical latching and locking device. Upon activation of the trigger, a signal may be received at a trigger input to indicate that the trigger is active. Once the trigger is active, the process continues to block 1815. Otherwise, the process continues to block 1813.

At block 1813 the process ensures that the electro-mechanical latching and locking device is in a latched and locked position. In doing so, the process may send a CLOSED command to a motor driver, for example motor driver 1619 shown in FIG. 16. The motor driver then may signal or command a motor, for example motor 1621 shown in FIG. 16, to rotate in a direction that places a lever arm in a latched and locked position if the lever arm is not in such position. In some embodiments, the lever aim is in the latched and locked position if it is placed vertically at a 90 degrees angle. In addition to sending the CLOSED command to the motor driver, the process may set a variable that tracks status of a drawer of the electro-mechanical latching and locking device to CLOSED if the variable is not currently set to CLOSED. The process then returns to block 1811.

At block 1815 the process determines the status of the drawer of the electro-mechanical latching and locking device. In doing so, the process may perform a read operation of the variable the tracks the status of the drawer. If the status of the drawer is OPEN, the process continues to block 1817. Otherwise, the process continues to block 1819.

At block 1817 the process determines whether or not a drawer switch or a tandem switch is active. The tandem switch in some embodiments is a drawer switch of a secondary electro-mechanical device connected in tandem with the electro-mechanical latching and locking device. Connecting both electro-mechanical devices in tandem for example may allow for synchronic activation. For example, if one electro-mechanical device is independently or both together activated, both electro-mechanical devices will be activated and provide position feedback. This is particularly useful in wide applications where a user activation point may vary and provide only enough displacement or bias at one device to provide activation. In some embodiments, the drawer switch or the tandem switch is activated when a catch or striker moves horizontally inward to bias a latch receiver inward resulting in activation of the drawer or tandem switch. In some embodiments, the drawer switch or the tandem switch is activated if the activation is continuous or uninterrupted for a fixed duration, for example 0.03 second or 30 milliseconds. If the drawer switch or the tandem switch is activated, the process continues to block 1821. Otherwise, the process returns to block 1811.

At block 1821 the process updates the status of the drawer to indicate that the drawer is closed. In doing so, the process may set the variable that tracks the status of the drawer to CLOSED. Moreover, the process may in turn send a CLOSED command to the motor driver to place the lever arm in the latched and locked position if the lever arm is not in such position. The process thereafter returns.

At block 1819, the process determines whether or not the drawer switch or the tandem switch is active. As previously mentioned, the tandem switch may be the drawer switch of the secondary electro-mechanical device connected in tandem with the initial electro-mechanical latching and locking device. Furthermore, the drawer switch or the tandem switch in some embodiments is activated when the catch or striker moves horizontally inward to bias the latch receiver inward resulting in activation of the drawer or tandem switch. In some embodiments, the drawer switch or the tandem switch is activated if the activation is continuous or uninterrupted for a fixed duration, for example 0.08 second or 80 milliseconds. Such requirement would filter out unintentional or unwanted actions such as inadvertent bump of the drawer, unforeseen electrical signal spikes, or in a case of a multi-drawer or door cabinet, slamming of a neighboring drawer or door may provide enough momentum to activate the drawer switch. If the drawer switch or the tandem switch is activated, the process continues to block 1823. Otherwise, the process returns to block 1811.

At block 1823, the process performs unlocking operation of the drawer. In doing so, the process may send an OPEN command to the motor driver. The motor driver in turn commands the motor to rotate in a direction to displace the lever arm that secures the latch receiver. Once the motor has displaced the lever arm, the latch receiver is free to move and release the catch or striker allowing the drawer to open. The process then continues to block 1825.

At block 1825 the process again determines whether or not the drawer switch or the tandem switch is active. In some embodiments when the drawer or tandem switch is activated, pulses may be generated as a result. These pulses however may comprise brief bursts that possess irregular shapes or spikes and can occur at random intervals. Such irregularities in the pulses may signal that the drawer or tandem switch is activated multiple times. Therefore, in some embodiments additional determination of whether or not the drawer or tandem switch is necessary to process such pulses before proceeding. If the drawer switch or the tandem switch is activated, the process continues to block 1827. Otherwise, the process returns to block 1823.

At block 1827 the process waits for a fixed duration. In some embodiments when the unlocking operation is performed, the catch or striker moves horizontally away from the electro-mechanical device in a lock-lever path resulting in the release of the catch or striker with the latch receiver. Therefore, in some embodiments delaying for the fixed duration ensures that the catch or striker has cleared the lock-lever path. The fixed duration for example may be 0.3 second or 300 milliseconds. The process then continues to block 1829.

At block 1829 the process updates the status of the drawer indicating that the drawer is open. In doing so, the process may set the variable that tracks the status of the drawer to OPEN. The process then continues to block 1831.

At block 1831 the process places the electro-mechanical device to the latched and locked position. In some embodiments, the process may send a signal to the motor driver which in turn activates the motor to rotate in a direction that returns the lever arm to its original position.

The process thereafter returns.

Figure 19:
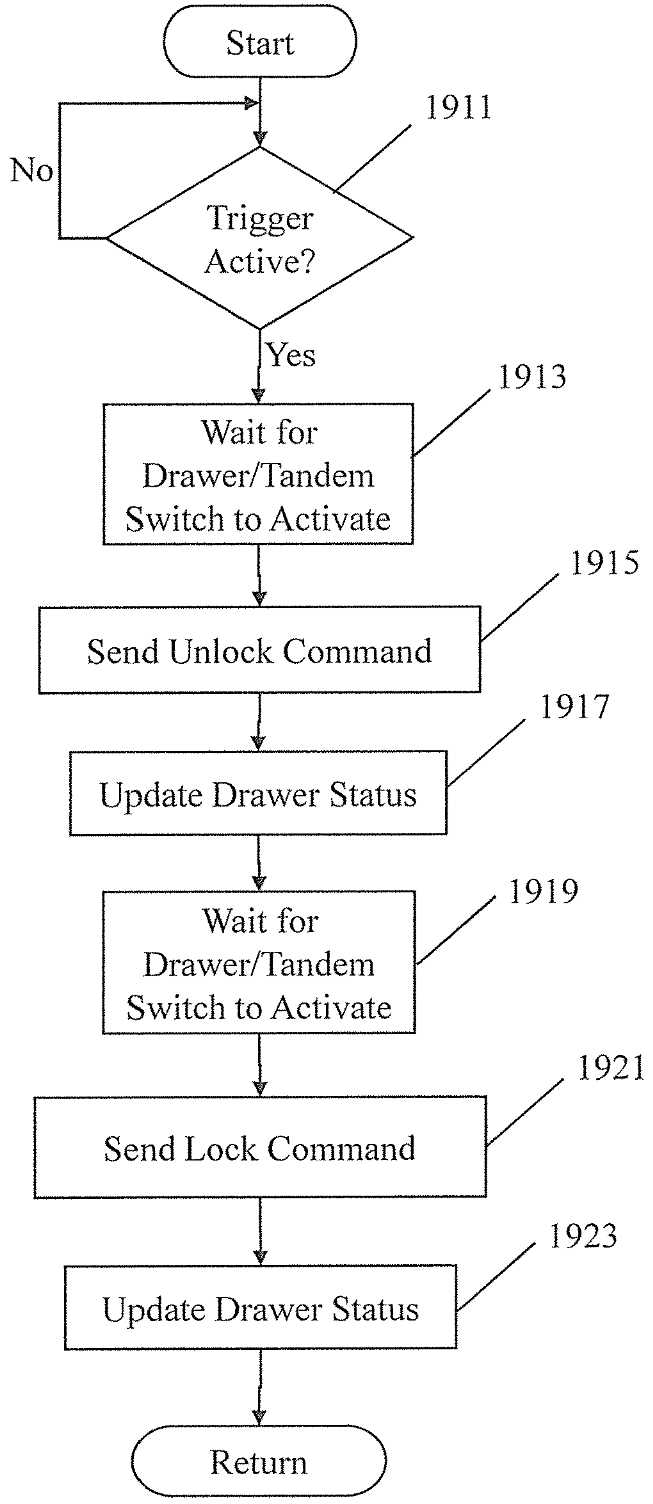
FIG. 19 is a flow diagram illustrating a process for controlling an electro-mechanical latching and locking device in accordance with aspects of the invention.

FIG. 19 is a flow diagram illustrating a process for controlling an electro-mechanical latching and locking device in accordance with aspects of the invention. The process is generally performed by a microcontroller or microprocessor. In one embodiment, the process may be performed by the circuitry shown in. FIG. 16. In another embodiment, the process may be performed by electronic circuitry.

At block 1911 the process determines whether or not a trigger is active. In some embodiments, the trigger may be activated by a device equipped with a keypad, RFID reader, biometric, near field communication (NFC), or any other device used to authenticate user access. For example, the trigger may be activated when the device is in proximity with the electro-mechanical latch/locking device. Upon activation of the trigger, a signal may be received at a trigger input to indicate that the trigger is active. Once the trigger is active, the process continues to block 1913. Otherwise, the process returns to block 1911.

At block 1913 the process waits for a drawer or a tandem switch of the electro-mechanical latch/locking device to activate. In some embodiments, the process may perform a loop operation until the drawer or tandem switch is activated. The tandem switch in some embodiments is a drawer switch of a secondary electro-mechanical latch/locking device connected in tandem with the initial electro-mechanical latch/locking device. Connecting both electro-mechanical latch/locking devices in tandem for example may allow for synchronic activation. For example, if one electro-mechanical latch/locking device is independently or both together activated, both electro-mechanical devices will be activated and provide position feedback. This is particularly useful in wide applications where a user activation point may vary and provide only enough displacement or bias at one device to provide activation. In some embodiments, the drawer switch or the tandem switch is activated when a catch or striker moves horizontally inward to bias a latch receiver inward resulting in activation of the drawer or tandem switch. In some embodiments, the drawer switch or the tandem switch is activated if the activation is continuous or uninterrupted for a fixed duration, for example 0.08 second or 80 milliseconds. The process then continues to block 1915.

At block 1915 the process sends unlock command to perform unlocking operation of a drawer. In some embodiments, the process may send an OPEN command to a motor driver which in turn commands a motor to rotate in a direction to displace a lever arm that secures a latch receiver. Once the motor has displaced the lever arm, the latch receiver is free to move and release the catch or striker allowing the drawer to open. Subsequent to the opening of the drawer, the motor driver in some embodiments activates the motor to return the lever arm to its original position. The process then continues to block 1917.

At block 1917, the process updates status of the drawer. In doing so, the process in some embodiments may assign a value indicative of OPEN to a variable that tracks the status of the drawer. The process then continues to block 1919.

At block 1919 the process again waits for the drawer or the tandem switch of the electro-mechanical latch/locking device to activate. The process may for example perform a loop operation until the drawer or the tandem switch is active. As previously mentioned, the drawer switch or the tandem switch in some embodiments is active when the catch or striker moves horizontally inward to bias the latch receiver inward resulting in activation of the drawer or tandem switch. In some embodiments, the drawer switch or the tandem switch is activated if the activation is continuous or uninterrupted for a fixed duration, for example 0.03 second or 30 milliseconds. The process then continues to block 1921.

At block 1921 the process sends a lock command to perform locking operation of the drawer. The process for example may send a CLOSED command to the motor driver to place the lever arm in the latched and locked position if the lever arm is not in such position. The process then continues to block 1923.

At block 1923 the process updates the status of the drawer. The process in some embodiments may assign a value indicative of CLOSED to a variable that tracks the status of the drawer.

The process thereafter returns.

Although the invention has been discussed with respect to various embodiments, it should be recognized that the invention comprises the novel and non-obvious claims supported by this disclosure.

What is claimed is:

1. An electro-mechanical locking device for cabinetry, comprising:

a rotatable latch receiver for receiving a latch striker;

a lever arm for maintaining the latch receiver in a locking position;

an actuator for driving the lever arm to an unlocking position;

a first sensor for detecting an indication of inward movement, relative to the cabinetry, of the latch striker; and a controller configured to command the actuator to drive the lever arm to the unlocking position based on detection by the first sensor of the indication of inward movement of the latch striker.

2. The electro-mechanical locking device of claim 1, wherein the controller is configured to command the actuator to drive the lever arm to the unlocking position only upon every other occurrence of the first sensor detecting the indication of inward movement of the latch striker.

3. The electro-mechanical locking device of claim 1, wherein the controller is configured to command the actuator to drive the lever aim to the unlocking position only if a command has also been received from an external access control device.

4. The electro-mechanical locking device of claim 3, wherein the external access control device is a radio frequency identification (RFID) device.

5. The electro-mechanical locking device of claim 1, wherein the controller is additionally configured to command the actuator to drive the lever arm to the unlocking position based on a signal indicative of inward movement, relative to the cabinetry, of a second latch striker.

6. The electro-mechanical locking device of claim 5, wherein the second latch striker is associated with a second electro-mechanical locking device for cabinetry.

7. The electro-mechanical locking device of claim 1, wherein the controller is additionally configured to command the actuator to activate to allow the lever arm to return to a locking position.

8. The electro-mechanical locking device of claim 1, wherein the controller is additionally configured to command the actuator to activate to allow the lever arm to return to a locking position after a change in state of the first sensor.

9. The electro-mechanical locking device of claim 1, wherein the lever arm is normally biased to a locking position by a lever arm spring.

10. The electro-mechanical locking device of claim 1, wherein the actuator is a motor.

11. The electro-mechanical locking device of claim 1, wherein the first sensor detects a position of the latch receiver.

12. The electro-mechanical locking device of claim 1, further comprising an open-assist mechanism.

13. The electro-mechanical locking device of claim 12, wherein the open-assist mechanism normally biases a slide member of a drawer slide coupled to the electro-mechanical locking device to an open position.

14. The electro-mechanical locking device of claim 1, further comprising a second sensor for detecting a position of the lever arm.

15. The electro-mechanical locking device of claim 14, further comprising a cam coupling a shaft of the actuator and the lever arm, and a third sensor for detecting a position of the cam.

16. The electro-mechanical locking device of claim 15, wherein the controller is further configured to determine a secure status indicator based on inputs from the first sensor, the second sensor, and the third sensor.

17. The electro-mechanical locking device of claim 16, wherein the controller is configured to set the secure status indicator to secure upon the first sensor indicating the inward movement of the latch striker and the second sensor indicating the lever arm is in a locking position and the third sensor indicating the cam is in a locking position.

18. A method of operating a lock for a cabinet, the lock including a latch receiver for receiving a latch striker and an actuator for unlocking the latch receiver, and a controller for commanding operation of the actuator, the method comprising:

receiving a first indication that the latch striker has moved to a position inward in the cabinet;

commanding, by the controller, the actuator to provide for unlocking of the latch receiver in response to the first indication.

19. The method of claim 18, wherein the lock further includes a lever arm for maintaining the latch receiver in a locking position, with the actuator unlocking the latch receiver by driving the lever arm to an unlocking position.

20. The method of claim 19, further comprising:

after commanding the actuator to provide for unlocking of the latch receiver, receiving an indication that the latch striker has moved to a position other than inward in the cabinet; and after receiving the indication that the latch striker has moved to the position other than inward in the cabinet, commanding, by the controller, the actuator to provide for movement of the lever arm to a locking position.

21. The method of claim 20, wherein commanding, by the controller, the actuator to provide for movement of the lever arm to a locking position comprises commanding the actuator to drive to a position allowing a spring biasing the lever arm to return the lever arm to the locking position.

22. The method of claim 18, further comprising commanding, by the controller, the actuator to provide for unlocking of the latch receiver based on receipt of a signal indicating that a latch striker of another lock for the cabinet has moved to a position inward in the cabinet.

23. The method of claim 18, wherein the actuator is a motor.

24. A locking system for cabinetry, comprising:

at least one locking device, each including a receiver for receiving a striker and means for maintaining the receiver in a locked position; and a controller configured to command unlocking of the receiver by the means for maintaining the receiver in the locked position based on an indication that a striker associated with at least one of the at least one of the locking devices has been moved inward into the cabinetry.

25. The locking system of claim 24, wherein the at least one locking device comprises a plurality of locking devices, and wherein the controller is configured to command unlocking of particular ones of the locking devices based on an indication that a striker associated with one of the particular ones of the locking devices has been moved inward into the cabinetry.

26. The locking system of claim 25, wherein the particular ones of the locking devices comprise a pair of locking devices for a drawer of the cabinetry.

27. The locking system of claim 25, wherein the controller is configured to command unlocking of particular ones of the locking devices based on an indication that a striker associated with one of the particular ones of the locking devices has been moved inward into the cabinetry for at least more than a fixed duration.

28. The locking system of claim 27, wherein the controller is configured to command locking of particular ones of the locking devices after receiving an indication that the striker associated with one of the particular ones of the locking devices is no longer moved inward into the cabinetry.

29. A locking system for cabinetry, comprising:

a locking device including a receiver for receiving a striker, means for maintaining the receiver in a locked position, and an actuator for actuating the means for maintaining the receiver in the locked position;

a first sensor for determining whether the receiver is in a locked position;

a second sensor for determining if the means for maintaining the receiver in the locked position is in a locking position;

a third sensor for determining an indication of whether the actuator is in a state to allow the means for maintaining the receiver in the locked position to be in a locking position; and a controller configured to command the actuator to allow the means for maintaining the receiver in the locked position to be in an unlocking position and to determine an indication of whether the receiver is securely maintained in the locked position based upon data received from at least one of the first, second, and third sensors.

30. The locking system of claim 29, wherein the controller is configured to determine that the receiver is securely maintained in the locked position when all of the first sensor determines the receiver is in the locked position, the second sensor determines that the means for maintaining the receiver in the locked position is in the locking position, and the third sensor determines that the actuator is in a state to allow the means for maintaining the receiver in the locked position to be in the locking position.

31. The locking system of claim 30, wherein the third sensor determines position of a cam coupled to the actuator.

* * * * *